F. P. Stiker,
Faucet,
№ 67,925.  Patented Aug. 20, 1867.
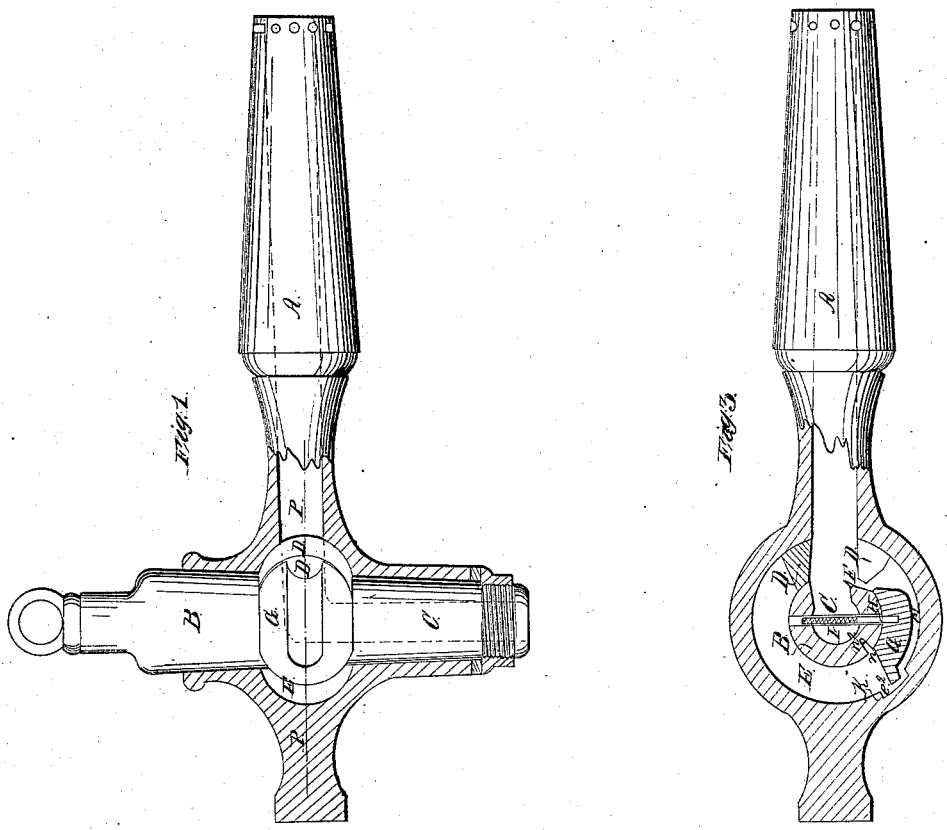
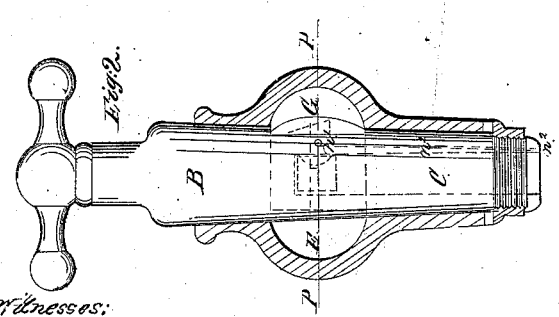
Witnesses:
Martin Beyer
Charles Stiker
Inventor
F. P. Stiker

United States Patent Office.

FLAVIEN P. STIKER, OF BUFFALO, NEW YORK.

Letters Patent No. 67,925, dated August 20, 1867.

IMPROVEMENT IN FAUCETS.

*The Schedule referred to in these Letters Patent and making part of the same.*

TO ALL WHOM IT MAY CONCERN:

Be it known that I, FLAVIEN P. STIKER, of the city of Buffalo, county of Erie, and State of New York, have invented a new and useful Improvement on Beer-Faucets; and I do hereby declare that the following is a full, clear, and exact description thereof, reference being had to the annexed drawings, making a part of this specification, in which—

Figure 1 is a side view,

Figure 2 an end view, and

Figure 3 a top view at the crossing of the line P P in figs. 1 and 2.

The nature of my invention consists in forcing beer or liquid out of a faucet by a segment, which is made to turn in a groove inside of the faucet by simply turning the plug, and thereby causing it to foam as it reaches the vessel to receive it.

To enable others skilled in the art to use and make my invention, I will now proceed to describe its construction and operation.

When the faucet is open, as shown in the drawings, the beer or other liquid flows through the hole A in the shank of the faucet and the piece D D, which is fastened in its place by solder or otherwise, and thence through the hole C of the plug B out in the vessel to receive the same, as in ordinary faucets. But when the beer or liquid is stale it is necessary to give it an artificial flavor, or to make it work and foam, so whilst it runs out at C it also runs into the groove E at the notch F in the plug around the movable segment G (as shown in fig. 3, which is held in its place by the pin H, and the spring I or otherwise) at $e^1$, a recess cut in the segment G, thence at $e^2$, and thence into the groove E. Now in shutting off the faucet, which is done in the ordinary way by turning the plug, after the movable segment G (which moves with the plug) has crossed at K, the beer or liquid which is in the groove E will be forced out through the hole $n^1$, thence through the small hole $n^2$ of the plug, out in the vessel below, and thereby causing the beer or liquid to work or foam.

I do not claim as my invention the device of forcing beer or liquid out of a small hole, and thereby making it foam or work, but what I claim as my invention, and desire to secure by Letters Patent, is—

The plug B, in combination with the movable segment G and groove E, operating substantially as described and for the purpose herein set forth.

F. P. STIKER.

Witnesses:
MARTIN BEYER,
CHARLES STIKER.